(12) United States Patent
Gamache (10) Patent No.: US 6,974,015 B2
(45) Date of Patent: Dec. 13, 2005

(54) ONE-WAY BIDIRECTIONAL CLUTCH

(75) Inventor: Michael E. Gamache, Tolland, CT (US)

(73) Assignee: The Carlyle Johnson Machine Company, LLC, Bolton, CT (US)

( * ) Notice: Subject to any disclaimer, the term of this patent is extended or adjusted under 35 U.S.C. 154(b) by 0 days.

(21) Appl. No.: 10/796,432

(22) Filed: Mar. 9, 2004

(65) Prior Publication Data

US 2005/0199462 A1 Sep. 15, 2005

(51) Int. Cl.[7] .......................................... F16D 59/00
(52) U.S. Cl. ........................... 192/223.3; 188/134
(58) Field of Search ............................... 192/223.3, 15, 192/56.57, 56.55; 188/134; 74/89.39

(56) References Cited

U.S. PATENT DOCUMENTS

| | | | | |
|---|---|---|---|---|
| 2,834,443 | A * | 5/1958 | Olchawa | 192/223.3 |
| 3,667,578 | A * | 6/1972 | Johnson | 192/223.3 |
| 4,176,733 | A * | 12/1979 | Twickler | 188/134 |
| 4,597,477 | A * | 7/1986 | Miller | 192/223.3 |
| 4,850,458 | A * | 7/1989 | Allan et al. | 188/134 |
| 4,909,363 | A * | 3/1990 | Trommer | 192/223.3 |
| 6,769,527 | B1 * | 8/2004 | Paris | 192/223.3 |
| 2003/0051950 | A1 * | 3/2003 | Harvey | 188/134 |

* cited by examiner

Primary Examiner—Rodney H. Bonck
(74) Attorney, Agent, or Firm—McCormick, Paulding & Huber LLP (57) ABSTRACT

According to the present invention, a one-way, bi-directional clutch, includes an outer casing, an input shaft, an output shaft and a brake assembly. The input shaft includes a release cam portion and the output shaft includes a locking cam portion. The brake assembly includes a release cam portion that is complementary to the release cam portion of the input shaft, a locking cam portion that is complementary to the locking cam portion of the output shaft, a biasing element and at least one brake pad. The complementary release cam portion of the input shaft and brake assembly are operable to move the brake assembly to a release position when the sufficient torque is applied to the input shaft. The complementary locking cam portions of the output shaft and the brake assembly are operable to move the one or more brake pads to the brake position when the sufficient torque applied to the output shaft.

17 Claims, 7 Drawing Sheets

ONE-WAY BIDIRECTIONAL CLUTCH

BACKGROUND OF THE INVENTION

1. Field of the Invention

The present invention relates to mechanical clutches, in general and, more particularly, to one-way, bi-directional clutches.

2. Background Information

One-way, bi-directional clutch devices are mechanical devices that transmit torque from an input shaft to an output shaft in either rotational direction, but do not transmit torque from the output shaft to the input shaft. One-way, bi-directional clutches typically include a brake assembly that engages when more torque is applied to the output shaft than the amount of torque applied to the input shaft. The brake assembly, when engaged, prevents torque from translating from the output shaft to the input shaft in both directions.

One-way, bi-directional clutches, also commonly known as "no-back clutches," are used in numerous applications. No-back clutches are utilized where a user desires 1) to selectively control the movement of a mechanical device using a power source, and 2) to prevent undesirable movement of the mechanical device due to outside forces acting on the device. For example, no-back clutches are used to control the flaps on airplane wings, where a pilot may desire to raise or lower the wing flap, but does not desire to have the wing flap raise or lower under the force of the wind travelling over the wing. No back clutches are also commonly found on conveyor belts that operate at an angle in order to ensure that the conveyor belt, and its payload, do not reverse direction unless intended. There are at least three (3) known types of no-back clutches: the wrap spring-type, the sprag-type, and the locking wedge-type. Each of the above-listed types of no-back clutches, however, has various shortcomings.

For example, the wrap spring-type is unable to accommodate relatively large loads and/or shock loading. Therefore, the wrap spring-type design often requires a second locking device to ensure the clutch will lock, as desired under all loads.

The sprag-type no-back clutch consists of two standard one-way sprag clutches placed in series with a driving mechanism between them. The driving mechanism unlocks the one-way sprag clutches when driven from one side. However, the sprags of the sprag-type clutch are often forced back and forth between to an unlocked and locked position when the operator attempts to drive the input shaft in the same directions as the load on the output shaft. Such action often results in undesirable chatter or ratcheting.

The locking wedge-type typically includes a center locking bar having sharp edges at both ends (i.e., 2 points of contact). Because only two points of contact are used to prevent torque from translating torque from the output shaft to the input shaft, the locking wedge-type clutch suffers from a short field life due to failures.

Therefore, it is desirable to provide a one-way, bi-directional clutch that overcomes the known shortcomings in the art.

DISCLOSURE OF THE INVENTION

According to the present invention, a one-way, bi-directional clutch, includes an outer casing, an input shaft, an output shaft and a brake assembly. The outer casing has a first end. The input shaft is rotationally supported by the first end of the outer casing and has a flange with an integral release cam means. The output shaft is rotationally supported by the second end of the outer casing and has a flange with an integral locking cam means. The brake assembly includes a release cam means that is complementary to the release cam means of the input shaft, a locking cam means that is complementary to the locking cam means of the output shaft, and at least one brake pad. The brake assembly is movable between a brake position where the one or more brake pads are in contact with the first end of the outer casing and a release position where the one or more brake pads are not in contact with the first end of the outer casing. The complementary release cam means of the input shaft and brake assembly are operable to move the brake assembly to the release position when the torque applied to the input shaft is greater than the torque applied to the output shaft. The locking cam is operable to move the one or more brake pads to the brake position when the torque applied to the output shaft is greater than the torque applied to the input shaft. When the brake assembly is in the brake position, torque on the output shaft is not translated to the input shaft. When the brake assembly is in the release position, torque on the input shaft is permitted to translate to the output shaft.

According to one aspect of the present invention, the one-way bi-directional clutch (OWBD) of the present invention may also act as a torque limiter. The dimensions of the complementary locking cam means may be designed to limit the amount of force imparted by the brake assembly when in the braking position. Therefore, the OWBD clutch may be designed to have a "slip point", where the brake pads will "slip" along first end of the outer casing once a predetermined amount of torque is placed on the output shaft.

These and other objects, features, and advantages of the present invention will become apparent in light of the drawings and detailed description of the present invention provided below.

DETAILED DESCRIPTION OF THE INVENTION

Figure 1:
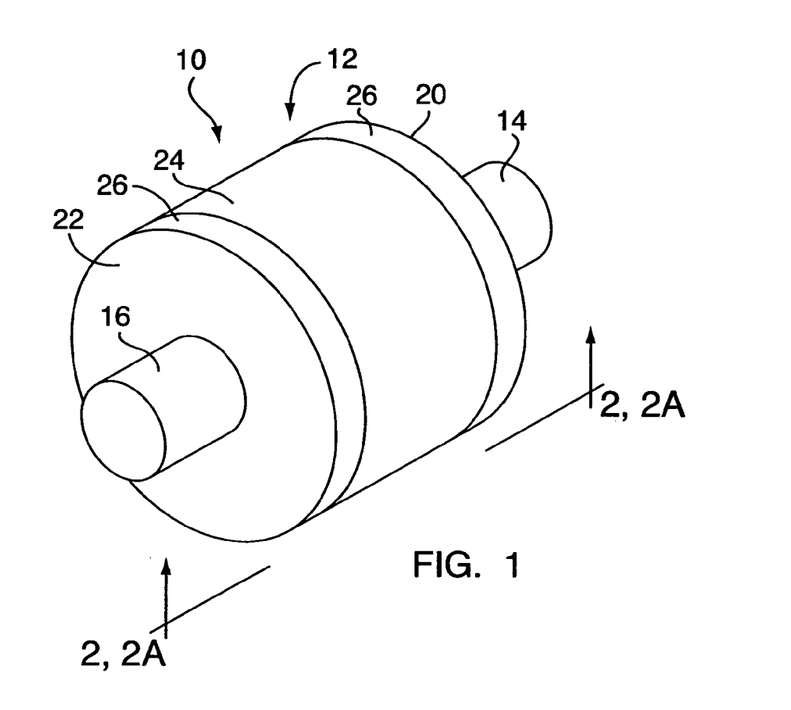
FIG. 1 is a perspective view of one embodiment of the present invention.
Figure 2:
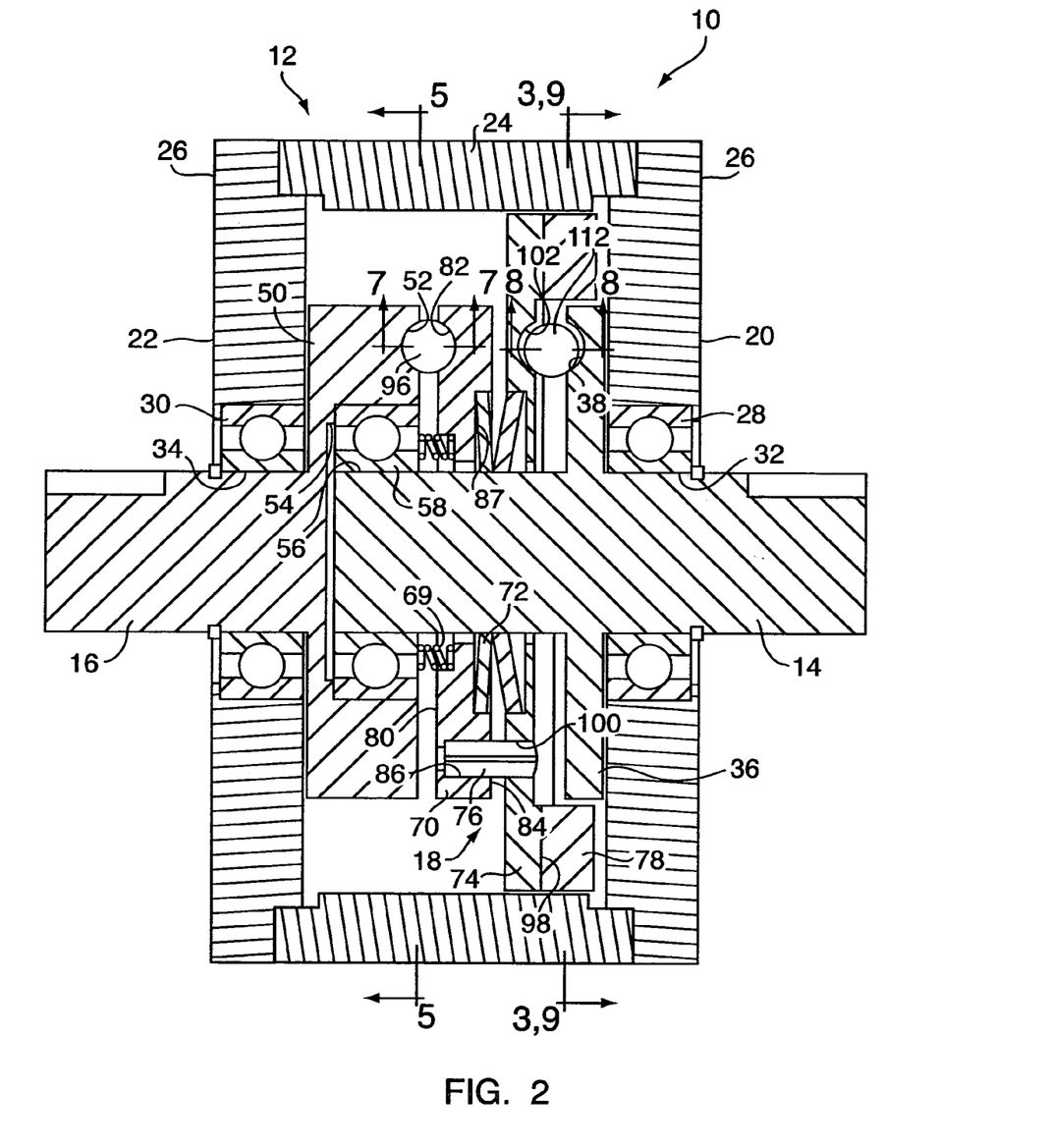
FIG. 2 is a sectional view of the present invention along line 2—2 of FIG. 1, depicting the OWBD clutch in a release position.
Figure 2A:
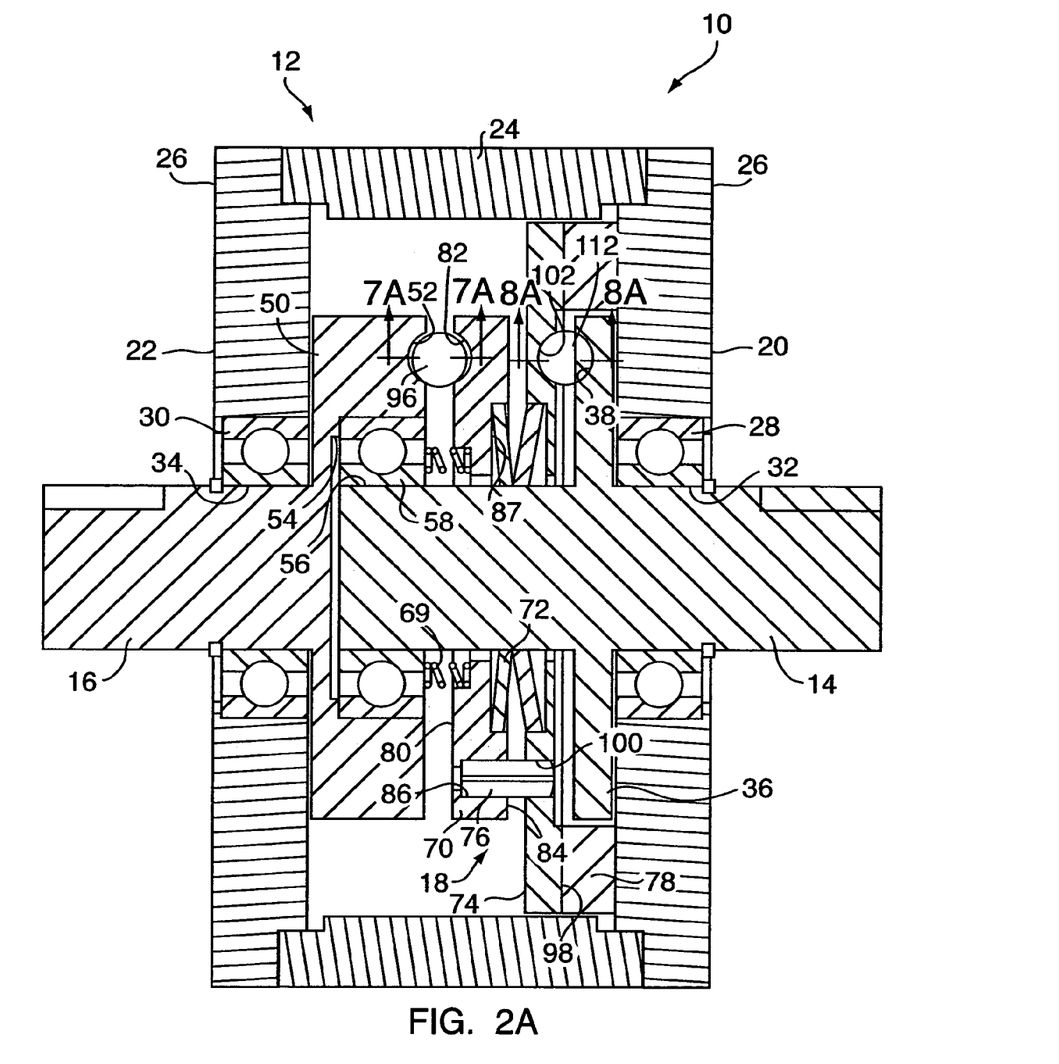
FIG. 2A is a sectional view of the present invention along line 2A—2A of FIG. 1 depicting the OWBD clutch in a brake position.

Referring to FIGS. 1, 2 and 2A, the one-way, bi-directional clutch of the present invention is generally referred to by the numeral 10. The one-way, bi-directional clutch (hereinafter referred to as "the OWBD clutch 10") includes an outer casing 12, an input shaft 14, an output shaft 16, and a brake assembly 18.

The outer casing 12 includes a first end 20 and a second end 22 and may have any suitable cross-sectional shape. However, an outer casing 12 with a generally circular cross-sectional shape, as shown in FIG. 1, has particular utility. The outer casing 12 is operable to house and/or support the various components of the OWBD clutch 10. In some embodiments, the outer casing 12 includes a tubular housing 24 with cover caps 26 substantially covering both ends, as shown for example in FIG. 1. However, the present invention is not to be considered so limited. For example, the outer casing 12 may alternatively consist of a first "cup"-shaped portion having a single open end that is covered by a single cover cap (not shown). Typically, the outer casing 12 is manufactured from any suitable metal; however, polymeric materials, in some applications, are also acceptable.

The outer casing 12 is operable to rotationally support the input shaft 14 and the output shaft 16. In some embodiments, the outer casing 12 includes at least two bearings 28, 30 for rotationally supporting the input shaft 14 and the output shaft 16. Suitable bearings 28, 30 are commercially available and can be individually selected by the designer or end user to suit the specific demands of the OWBD clutch 10.

The input shaft 14 and the output shaft 16 typically include elongated, cylindrical bodies projecting through openings 32, 34 in the first and second ends 20,22 of the outer casing 12, respectively. In some embodiments, both the input shaft 14 and the output shaft 16 are made of any suitable metal; however, polymeric materials are suitable in some applications. In use, the input shaft 14 is typically connected to a power source, such as a motor (not shown) and the output shaft 16 is typically connected to a device (not shown) powered by a rotating shaft.

Figure 3:
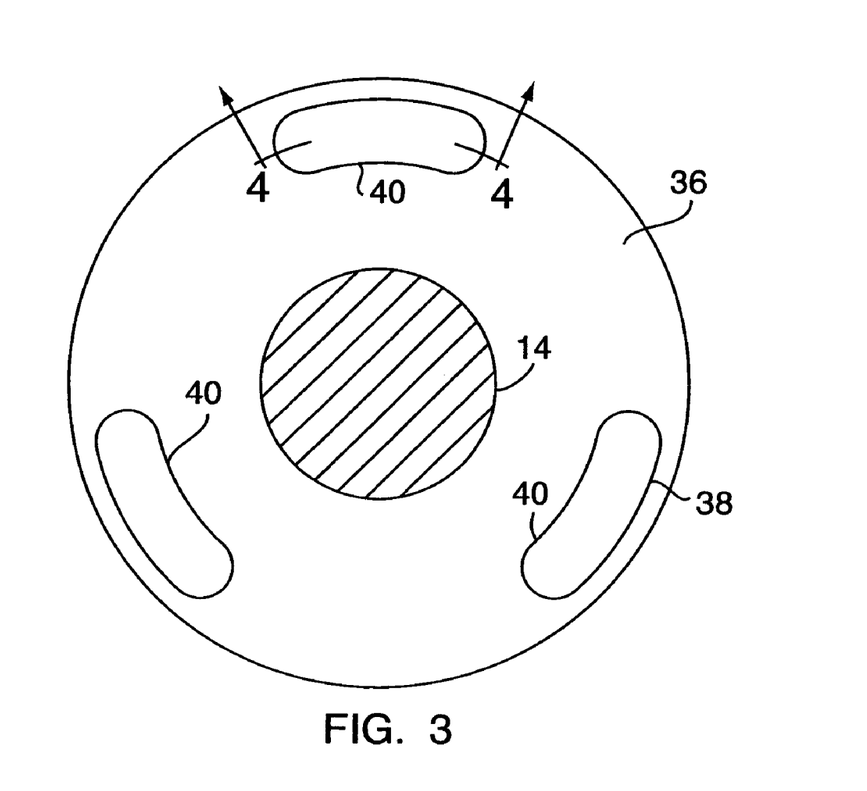
FIG. 3 is a front view of the input shaft flange along line 3—3 of FIG. 2.

Referring to FIGS. 2, 2A and 3, the input shaft 14 extends through the first end 20 of the outer casing 12. The input shaft 14 includes a flange 36 and an integral release cam means 38. The flange 36 is typically circular, as shown in FIG. 3. The release cam means 38 is located on the flange and is operable to work in concert with a complementary release cam means (discussed below) on the brake assembly 18 such that the brake assembly 18 is urged toward a release position (as shown in FIG. 2 and discussed below) when torque is placed on the input shaft 14.

Figure 4:
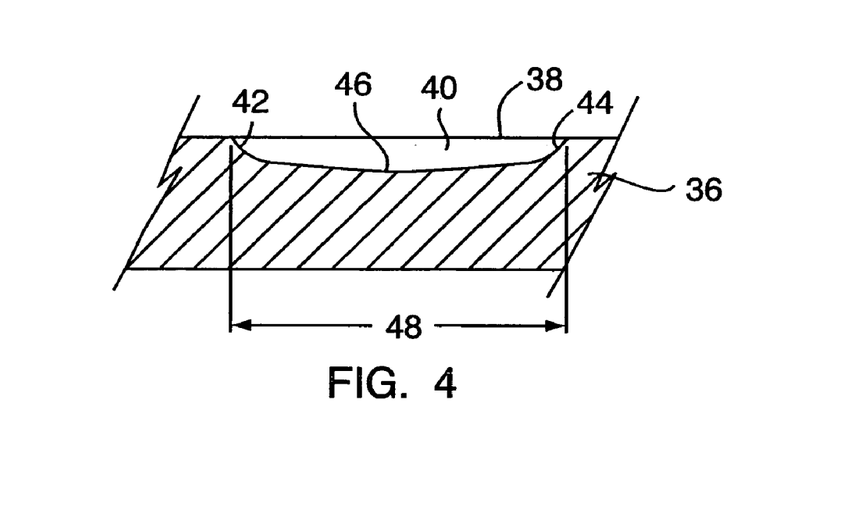
FIG. 4 is a side view of the integral release cam divot in the input shaft flange along line 4—4 of FIG. 3.

In some embodiments, as shown in FIGS. 3 and 4, the release cam means 38 of the flange 36 of the input shaft 14 includes at least three (3) release cam divots 40 located about the central axis of the input shaft 14. The release cam divots 40 may have any suitable dimensions. In the embodiment shown, the release cam divots 40 have two shallow portions 42, 44 surrounding a deep portion 46, as shown in the release cam divots of FIG. 4. The shallow and deep portions 42,44,46 of the release cam divots 40 may be any suitable depth. The actual depth of each portion 42,44,46 is determined by a number factors, including, but not limited to, the size of bearings (discussed below), and the various dimensions of the components of the brake assembly 18.

The transition between the shallow portions 42,44 and the deep portion 46 of the release cam divots 40 may be of any suitable shape. For example, as shown in FIG. 4, the transitions between the two shallow portions 42,44 and the deep portion 46 are curved in shape. However, although not shown, the release cam divots 40 may transition from the deep portion 46 to the shallow portion 42,44 along a straight line, as well. In addition, the release cam divots 40 may be of any suitable width 48, as shown in FIG. 4. The various advantages and disadvantages of having a wider or narrower cam divot width will be obvious to one of skill in the art and, therefore, will not be discussed in greater detail herein.

Figure 5:
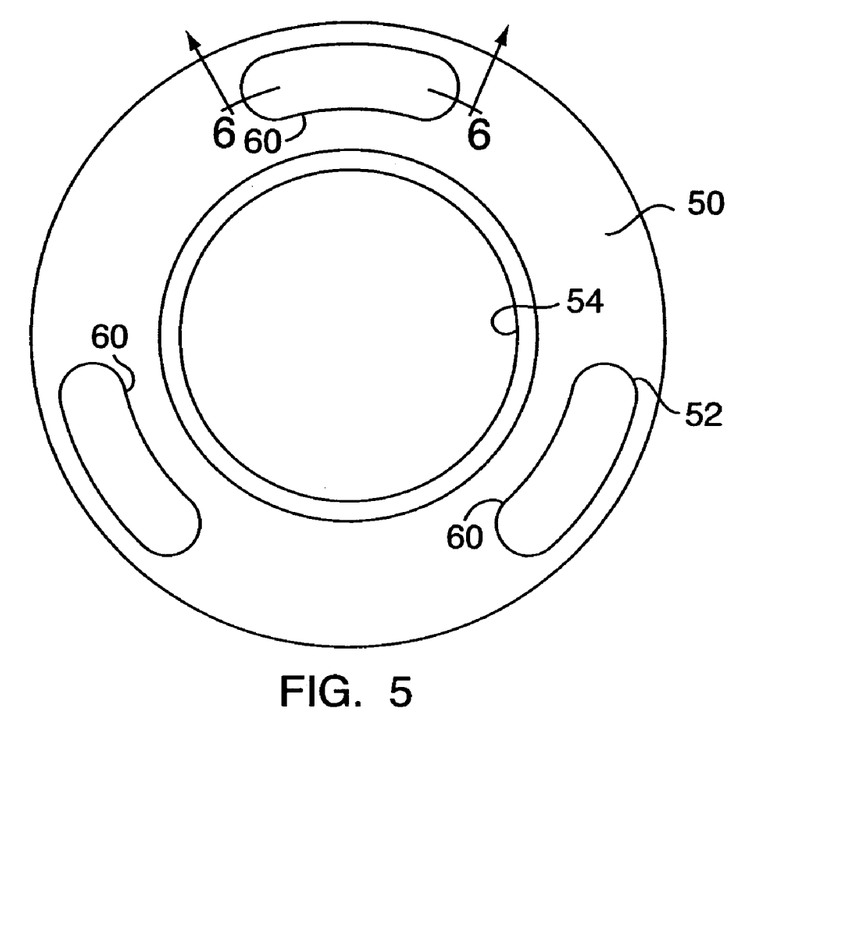
FIG. 5 is a front view of the output shaft flange along line 5—5 of FIG. 2.

Referring to FIGS. 2, 2A and 5, the output shaft 16 includes a flange 50 and an integral locking cam means 52. The locking cam means 52 of the output shaft 16 is operable to work in concert with a locking cam means (discussed below) of the brake assembly 18 to urge the brake assembly 18 to a brake position (discussed below). The flange 50 of the output shaft 16 is typically circular, as shown in FIG. 5. In some embodiments, the output shaft 16 includes a bore 54 that rotationally supports an end 56 of the input shaft 14. Preferably, in embodiments where the output shaft 16 includes a bore 54 to support one end 56 of input shaft 14, a bearing 58 is seated in the bore 54 to facilitate smooth rotation of the input shaft 14 relative to the output shaft 16 within the OWBD clutch 10 during operation.

Figure 6:
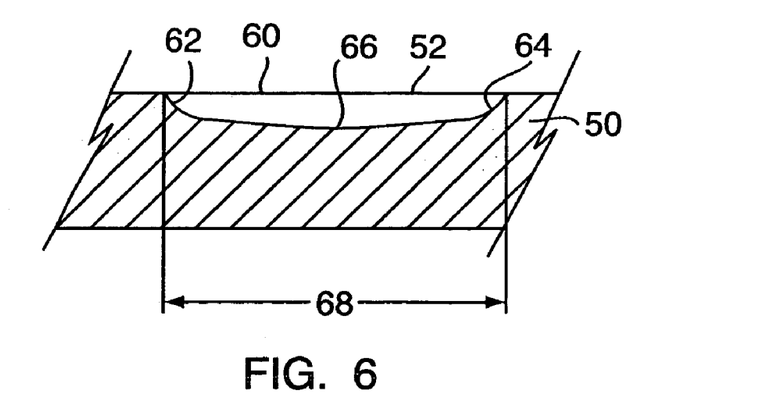
FIG. 6 is a cross-sectional view of the integral release cam divot in the input shaft flange along line 6—6 of FIG. 5.

In some embodiments, the locking cam means 52 of the output shaft 16 includes at least three (3) locking cam divots 60 located about the central axis of the output shaft 16, as shown in FIGS. 5 and 6. The locking cam divots 60, like the release cam divots 40 (described above), include two shallow portions 62,64 surrounding a deep portion 66. The locking cam divots 60 of the output shaft 16 may have any suitable dimensions (i.e., width 68, depth and shape), depending on the needs and wants of the end user. In addition, the locking cam divots 60 on the output shaft 16 may have similar or different dimensions than the release cam divots 40 of the input shaft 14; however, the locking cam divots 60 dimensions are substantially identical to the dimensions of the release cam divots 40 in a preferred embodiment. The advantages and disadvantages of having identical or different release cam divots and locking cam divots will be obvious to one skilled in the art and, therefore, will not be discussed in greater detail herein.

Referring back to FIGS. 2 and 2A, the brake assembly 18 includes a first biasing member 69, a floating locking plate 70, a second biasing member 72, a locking disc 74, at least one roll pin 76, and at least one brake pad 78. The floating locking plate 70, a biasing member 72 and a locking disc 74 are positioned around the input shaft 14, between the flange 50 of the output shaft 16 and the first end 20 of the outer casing 12. The brake assembly 18 is operable to work in concert with the locking cam means 52 of the output shaft 16 and the release cam 38 of the input shaft 14 to move the brake assembly 18 between a brake position (as shown in FIG. 2A) and a release position (as shown in FIG. 2), respectively. In the brake position, one or more brake pads 78 are in contact with the first end 20 of the outer casing 12. In the release position, the brake pads 78 are free from contact with the first end 20 of the outer casing 12.

The first biasing member 69 is positioned around the input shaft 14 and adjacent the flange 36 of the input shaft 14. The first biasing member 69 is operable to bias the floating locking plate 70 towards the first end 20 of the outer casing 12. Suitable first biasing members 69 include, but are not limited to, spring washers and compression springs. In a preferred embodiment, the first biasing member 69 is a compression spring, as shown in FIG. 2.

The floating locking plate 70 is positioned around the input shaft 14 adjacent to the flange 50 of the output shaft 16. The floating locking plate 70 has a first side 80 that includes an integral locking cam means 82 that is complementary to the locking cam means 52 of the flange of the output shaft 16. Together, the locking cam means 52 of the output shaft 16 and the locking cam means 82 of the floating locking plate 70 are operable to urge the brake assembly 18 toward the brake position (shown in FIG. 2A) when the output shaft 16 and the floating locking plate 70 are rotated relative to one another. A second side 84 of the floating locking plate 70 includes a bore 86 to accommodate each one of the one or more roll pins 76. In some embodiments, the second side 84 of the floating locking plate 70 also includes a bore 87 sized to seat one end of the second biasing member 72.

In some embodiments, the locking cam means 82 of the floating locking plate 70 includes three (3) locking cam divots 88 that face locking cam divots 60 on the flange 50 of the output shaft 16, as shown in FIGS. 2 and 2A. Typically, the locking cam divots 88 of the floating locking plate 70 are identical to the locking cam divots 60 of the output shaft 16 when present. However, the present invention is not to be considered so limited. Similar to the locking cam divots 60 of the output shaft 16, the locking cam divots 88 of the floating locking plate 70 include two shallow portions 90,92 surrounding a deep portion 94 (as shown, for example, in FIGS. 7 and 7A. The locking cam divots 88 of the floating locking plate 70 may have any suitable dimensions (i.e., depth, width and shape).

Figure 7:
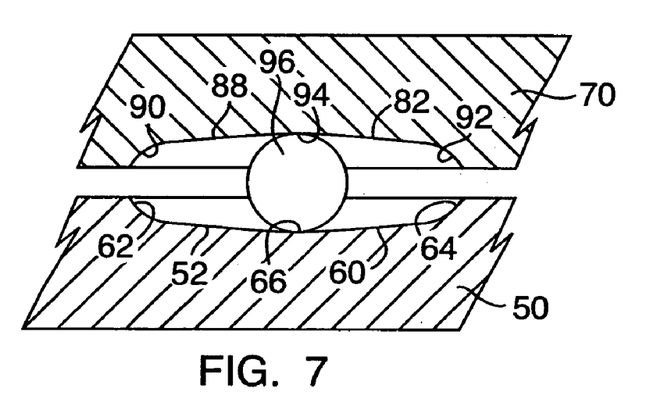
FIG. 7 is a cross-sectional view (rotated 90 degrees) of the flange along line 7—7 of FIG. 2 depicting the output shaft and the floating locking plate wherein a bearing is located in the deep portion of the complementary locking cam divots.
Figure 7A:
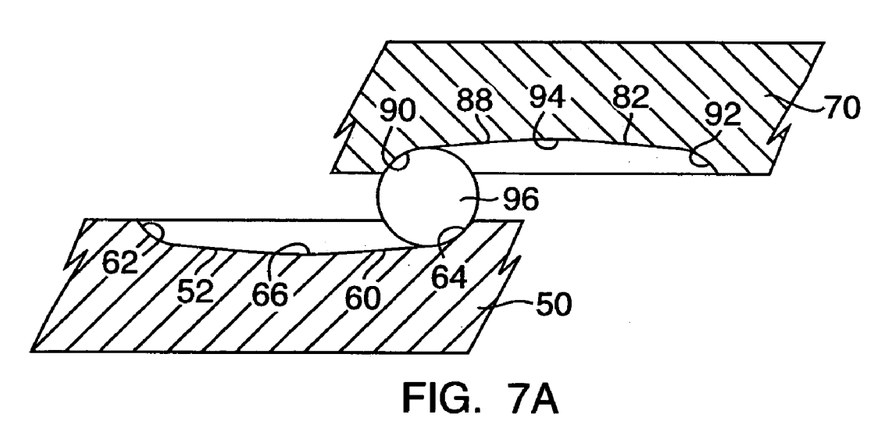
FIG. 7A is a cross-sectional view (rotated 90 degrees) of the flange along line 7A—7A of FIG. 2A depicting the output shaft and the floating locking plate wherein the bearing is located in the shallow portion of the complementary locking cam divots.

Referring to FIGS. 7 and 7A, in embodiments utilizing locking cam divots 88,60 in the floating lock plate 70 and the output shaft 16, a bearing 96 is disposed between the corresponding locking cam divots 88,60. The bearing 96 is typically spherical and operable to move within the locking cam divots 88,60 when the floating locking plate 70 and the output shaft 16 rotate relative to one another. When the floating locking plate 70 and the output shaft 16 are rotated relative to one another, the bearing 96 moves from the deep portion 66,94 of the locking cam divots 60,88 (FIG. 7) to one of the shallow portions 62,64,90,92 of the locking cam divots 60,88 (FIG. 7A). Therefore, when the bearing 96 is in the deep portion 66,94 of the complementary locking cam divots 60,88, the floating locking plate 70 and the flange 60 of the output shaft 16 are located closer to one another, as shown in FIG. 7, as compared to when the bearing 96 is in the one of the shallow portion 62,64,90,92 of the complementary locking cam divots 60,88, as shown in FIG. 7A.

Referring back to FIGS. 2 and 2A, the second biasing member 72 is positioned around the input shaft 16 in between the floating locking plate 70 and the locking disc 74. The second biasing member 72 is operable to bias the floating locking plate 70 toward the second end 22 of the outer casing 12 and the locking disc 74 toward the first end 20 of the outer casing 12. Suitable second biasing members 72 include, but are not limited to, spring washers and compression springs. In a preferred embodiment, two spring washers are used, as shown in FIG. 2.

The locking disk 74 is positioned around the input shaft 16 between the second biasing member 72 and the flange 36 of the input shaft 14. The locking disc 74 has a first side 98. The radius of the locking disc 74 is greater than the radius of the flange 36 of the input shaft 14 such that a portion of the locking disc 74 extends outward radially beyond the flange 36 of the input shaft 14. The locking disc 74 also includes one or more bores 100 to accommodate each roll pin 76, as shown in FIG. 2. The first side 98 of the locking disc 74 includes an integral release cam means 102 that is complementary to the release cam means 38 of the input shaft 16. Together, the release cam means 38 of the input shaft 16 and the release cam means 102 of the locking disc 74 are operable to urge the brake assembly 18 toward the release position when the input shaft 16 and the locking disc 74 are rotated relative to one another.

In some embodiments, the release cam means 102 of the locking disc includes three (3) release cam divots 104 that face release cam divots 40 on the flange 36 of the input shaft 14. The release cam divots 102, like the release cam divots 40 (described above), include two shallow portions 106,108 surrounding a deep portion 110, as shown for example in FIGS. 8 and 8A. Typically, the release cam divots 104 of the locking disc 74 are identical to the release cam divots 40 of the input shaft 14. However, the present invention is not to be considered so limited. The release cam divots 104 of the locking disc 74 may be of any suitable dimensions (i.e., depth, width and shape).

Figure 8:
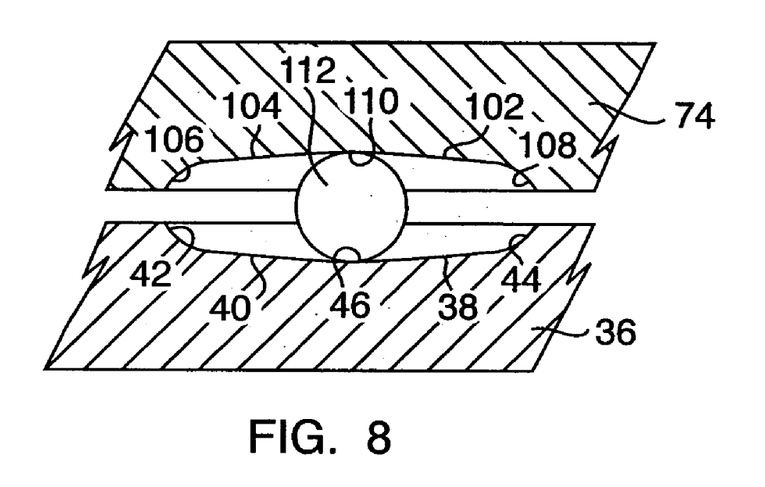
FIG. 8 is a cross-sectional view (rotated 90 degrees) of the flange along line 8—8 of FIG. 2 depicting the input shaft and the locking disc wherein the bearing is located in the deep portion of the complementary release cam divots.
Figure 8A:
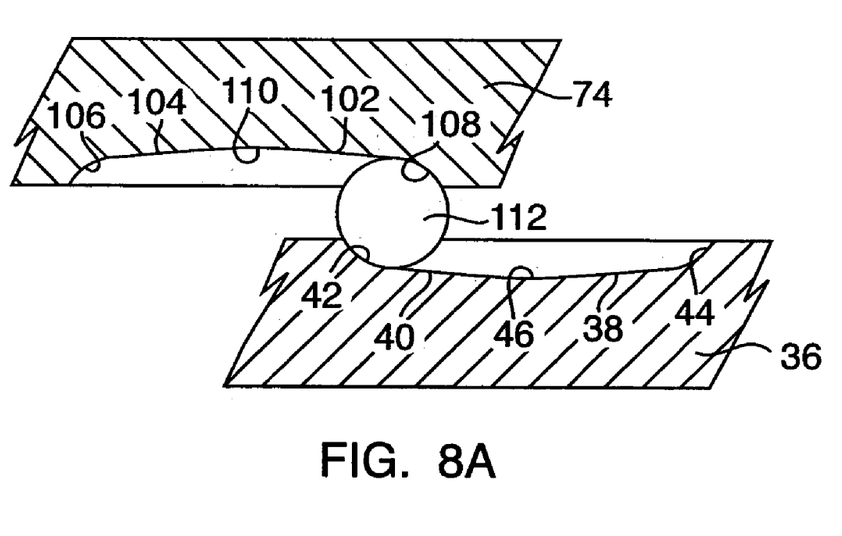
FIG. 8A is a cross-sectional view (rotated 90 degrees) of the flange along line 8A—8A of FIG. 2A depicting the input shaft and the locking disc wherein the bearing is located in the shallow portion of the complementary release cam divots.

Referring to FIGS. 8 and 8A, in embodiments utilizing release cam divots 40,104 on the input shaft 14 and the locking disc 74, a bearing 112 is disposed between the corresponding release cam divots 40,104. The bearing 112 is operable to move within the complementary release cam divots 40,104 when the locking disc 74 and the input shaft 16 rotate relative to one another. Depending on the relative position, the bearing 112 moves from the deep portion 46,110 of each of the complementary release cam divots 40,104 to one of the shallow portions 42,44,106,108. Therefore, when the bearing 112 is in the deep portions 46,110 of the complementary release cam divots 40,104, the locking disc 74 and the flange 36 of the input shaft 16 are located closer to one another, as shown in FIG. 8, as compared to when the bearing 112 is located in the shallow portions 42,44,106,108, as shown in FIG. 8A.

The complementary locking cam means 52,82 of the output shaft 16 and the floating locking plate 70 and complementary release cam means 38,102 of the input shaft 14 and the locking disc 74 are not to be considered limited to the specific embodiment described above. Each of the locking cam means 52,82 and the release cam means 38,102 may include any camming system known to those of skill in the art. Known camming systems include, but are not limited to, those utilizing roller ramps, offset rollers, and pinned cams and linkages.

The one or more roll pins 76 extend between the bores 86 in the floating locking plate 70 and the bores 100 in the locking disc 74. The roll pins 76 are typically cylindrical bodies that are operable to allow the floating locking plate 70 to move axially along the input shaft 14 relative to the locking disc 74, and to prevent the floating locking plate 70 and the locking disc 74 from rotating relative to one another. Each of the one or more roll pins 76 is secured in one of the floating locking plate 70 or the locking disc 74 and slip fitted in the other.

One or more brake pads 78 are affixed to the locking disc 74 on the portion of the locking disc 74 that extends outward radially beyond the flange 36 of the input shaft 14. Therefore, the one or more brake pads 78 are located on the locking disc 74 such that when the input shaft 14 and the locking disc 74 rotate relative to one another, the brake pads 78 do not contact the input shaft 14. Any suitable method for affixing the brake pads 78 to the locking disc 74 is acceptable, provided that the brake pads 78 do not undesirably become unattached during normal use. The brake pads 78 are sized such that the brake pads 78 contact the first end 20 of outer casing 12 when the brake assembly 18 is in the brake position. Typically, the brake pads 78 are substantially flat.

The brake pad(s) 78 are operable to resist rotational motion of the input shaft 14 and the output shaft 16 when in contact with the first end 20 of the outer casing 12. Brake pads 78 are well known in the art and will not be discussed in further length herein. The specific coefficient of friction of the brake pads 78 can be altered depending on the needs and desires of the end user.

In some embodiments, a material may be applied to the first end 20 of the outer casing 12 to increase or decrease the friction created between the first end 20 of the outer casing 12 and the brake pad 78 when the brake assembly 18 is in the braking position.

According to one aspect of the present invention, the OWBD clutch 10 of the present invention may also act as a torque limiter. In these embodiments, the dimensions of the complementary locking cam means 52,82 may be designed to limit the amount of force imparted on the first end 20 of the outer casing 12 by the brake pads 78 when the brake assembly 18 is in the braking position. Therefore, the OWBD clutch 10 may be designed to define a "slip point", where the brake pads 78 will "slip" along first end 20 of the outer casing 12 once a predetermined amount of torque is placed on the output shaft 16. In embodiments utilizing bearings 96 and complementary locking cam divots 60,88, the depth of the shallow portion 62,64,90,92 of the complementary locking cam divots 60,88 can be designed such that a "slip point" is created once a pre-determined torque is applied on the output shaft 16. Without the pre-determined slip point, the torque on the output shaft 16 can increase until one or more components of the OWBD clutch 10 undesirably fails.

Figure 9:
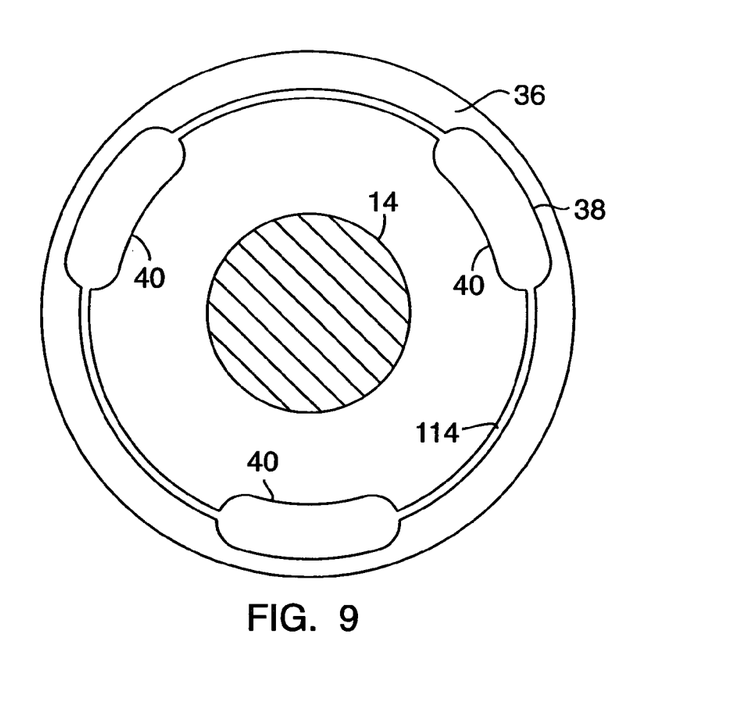
FIG. 9 is a front view of the of the input shaft flange along line 9—9 of FIG. 2 wherein the flange includes a track.

According to another aspect of the present invention, and now referring to FIG. 9, a track 114 may connect the release cam divots 40,104 of the locking disc 74 or input shaft 14. The track 114 is operable to prevent excessive torque on the input shaft 14 from causing one or more components to fail. The track 114 has a pre-determined depth such each of that the bearings 112 disposed between the locking disc 74 and the flange 36 of the input shaft 14 will roll out of the release cam divots 40,104, and onto the track 114, when a pre-determined maximum amount of torque is applied to the input shaft 14. Therefore, when the pre-determined maximum amount of the torque is applied to the input shaft 14, the one or more bearings 96 roll out of the release cam divots 40,104 and onto the track 114. The input shaft 14 and the locking disc 74 will, accordingly, rotate relative to one another until the one or more bearings 96 becomes seated in the next release cam divot 40,104. Such action repeats itself if the torque on the input shaft 14 remains above the pre-determined amount. Naturally, a track 114 can be utilized with the above-listed alternative release cam means, where appropriate.

In operation, when the OWBD clutch 10 is at rest (i.e., torque is not placed on either the input shaft 14 or output shaft 16) the first bias member 69 forces the floating locking plate 70 away from the flange 50 of the output shaft 16. The floating locking plate 70, in turn, presses against the second bias member 72, which transmits the force onto the locking disc 74. Therefore, the locking disc 74 and, accordingly, the brake pad(s) 78 move toward the first end 20 of the outer casing 12 until the one or more brake pads 78 contact the first end 20 of the outer casing 12. Therefore, the brake assembly 18 of the OWBD clutch 10 is in the brake position when at rest.

When sufficient torque is placed on the input shaft 14 (e.g., any torque greater than the torque placed on the output shaft 16), the flange 36 of the input shaft 14 rotates relative to the locking disc 74. The relative motion of the input shaft 14 and the locking disc 74 causes the complementary release cam means 38,102 to force the locking disc 74 to move away from the first end 20 of the outer casing 12 and away from the flange 36 of the input shaft 13. In embodiments utilizing one or more bearings 112 disposed between the release cam divots 40,104 of the input shaft 14 and the locking disc 74, the relative motion of the input shaft 14 and the locking disc 74 forces the one or more bearings 112 to travel toward the shallow portion 42,44,106,108 of the release cam divots 40,104, as shown in FIG. 8A. In all embodiments, the movement of the locking disc 74 compresses the first and second biasing members 69,72, thereby relieving any force that was forcing the one or more brake pads 78 against the first end 20 of the outer casing 12. Accordingly, the one or more brake pads 78 to move to the release position and away from the first end 20 of the outer casing 12. Once the brake pads 78 are free from contact with the first end 20 of the outer casing 12, the OWBD clutch 10 is able to translate torque applied on the input shaft 14 to the output shaft 16.

When sufficient torque is placed on the output shaft 16 (e.g., any torque greater than the torque placed on the input shaft), the flange 50 of the output shaft 16 rotates relative to the floating locking plate 70. The relative motion forces the locking cam means 52,82 of the floating locking plate 70 and the output shaft 16 to move the floating locking plate 70 toward the first end 20 of the outer casing 12. In embodiments utilizing one or more bearings 96 disposed between complementary locking cam divots 60,88 in the output shaft 16 and the floating locking plate 70, the relative motion forces each bearing 96 to travel toward the shallow portion 62,64,90,92 of each of the locking cam divots 60,88, as shown in FIG. 7A. In all embodiments, the movement of the floating locking plate 70 forces the second bias member 72 and, accordingly, the locking disc 74 to move towards the first end 20 of the outer casing 12 such that at least one brake pad 78 is in contact with the first end 20 of the casing 12. Once the one or more brake pads 78 are in the brake position, the OWBD clutch 10 is unable to translate torque applied on the output shaft 16 to the input shaft 14.

It will be obvious to those skilled in the art that various changes may be made without departing from the scope of the present invention and that the invention is not to be considered limited to what is described and exemplified in the specification. For example, the brake assembly described above can be modified to include variations known to those of skill in the art. Such modifications include, but are not limited to the inclusion of multiple disc friction plates, locking jaws, cone friction drum brake-type friction surfaces, and caliper-type locking mechanisms that utilize a self-contained piston.

What is claimed is:

1. A one-way, bi-directional clutch, comprising:
   an outer casing having a first end;
   an input shaft that is rotationally supported by the first end of the outer casing, the input shaft having a flange with an input shaft release cam means;
   an output shaft that is rotationally supported by a second end of the outer casing, the output shaft having a flange with an output shaft locking cam means;

a brake assembly comprising a brake assembly release cam means that is complementary to the input shaft release cam means, a brake assembly locking cam means that is complementary to the output shaft locking cam means, a biasing member, and at least one brake pad;

wherein the brake assembly is movable between a brake position where the one or more brake pads are in contact with the first end of the outer casing and a release position where the one or more brake pads are not in contact with the first end of the outer casing;

wherein the complementary release cam means of the input shaft and brake assembly are operable to move the brake assembly to the release position when sufficient torque is applied to the input shaft; and wherein the complementary locking cam means of the output shaft and brake assembly are operable to move the brake assembly to the brake position when sufficient torque is applied to the output shaft, and wherein the biasing member biases the brake assembly release cam means from the brake assembly locking cam means.

2. The one-way bi-directional clutch of claim 1, wherein torque applied to the output shaft is not translated to the input shaft when the brake assembly is in the brake position.

3. The one-way bi-directional clutch of claim 2, wherein torque applied to the input shaft is translated to the output shaft when the brake assembly is in the release position.

4. The one-way bi-directional clutch of claim 3, wherein the locking cam means of the output shaft includes at least one locking cam divot located on a flange of the output shaft;

wherein the locking cam means of the brake assembly includes at least one locking cam divot located on a floating locking plate; and wherein a bearing is disposed between each of the locking cam divots of the output shaft and the corresponding locking cam divots of the floating locking plate.

5. The one-way bi-directional clutch of claim 4, wherein the floating locking plate includes three (3) locking cam divots and the flange of the output shaft includes three (3) locking cam divots, wherein the locking cam divots of the output shaft are complementary to the locking cam divots of the floating locking plate.

6. The one-way bi-directional clutch of claim 5, wherein at least one of the locking cam divots of the output shaft includes two shallow portions surrounding a deep portion.

7. The one-way bi-directional clutch of claim 5, wherein at least one of the locking cam divots of the floating locking plate includes two shallow portions surrounding a deep portion.

8. The one-way bi-directional clutch of claim 3, wherein the complementary release cam means of the input shaft includes at least one release cam divot located on a flange of the input shaft, wherein the release cam means of the brake assembly includes at least one release cam divot located on a locking disc; and wherein a bearing is disposed between each of the release cam divots of the input shaft and the corresponding release cam divots of the locking disc.

9. The one-way bi-directional clutch of claim 8, wherein the locking disc includes three (3) release cam divots and the flange of the input shaft includes three (3) release cam divots, wherein the release cam divots of the input shaft are complementary to the release cam divots of the locking disc.

10. The one-way bi-directional clutch of claim 8, wherein at least one of the release cam divots of the input shaft includes two shallow portions surrounding a deep portion.

11. The one-way bi-directional clutch of claim 8, wherein at least one of the release cam divots of the locking disc includes two shallow portions surrounding a deep portion.

12. The one-way bi-directional clutch of claim 8, wherein the input shaft further includes a track having a pre-determined depth that connects each of release cam divots thereon, wherein each the bearings roll onto the track when a pre-determined amount of torque is applied to the input shaft.

13. The one-way bi-directional clutch of claim 8, wherein the locking disc further includes a track having a pre-determined depth that connects each of release cam divots thereon, wherein the bearings roll onto the track when a pre-determined amount of maximum torque is applied to the input shaft.

14. The one-way bi-directional clutch of claim 4, wherein the brake assembly further includes a second biasing member, the second biasing member being designed such that to bias the brake assembly in the brake position when torque is not being applied to the input and output shafts.

15. The one-way bi-directional clutch of claim 1, wherein the complementary locking cam means of the output shaft and the brake assembly define a slip point; and wherein the brake pad of the brake assembly slips along the first end of the outer casing when a pre-determined amount of torque is placed on the output shaft.

16. The one-way bi-directional clutch of claim 1, wherein a material is applied to the first end of the outer casing to alter the coefficient of friction between the one or more brake pads and the first end of the outer casing.

17. A one-way, bi-directional clutch, comprising:

an outer casing having a first end;

an input shaft that is rotationally supported by the first end of the outer casing, the input shaft having a flange with an input shaft release cam means;

an output shaft that is rotationally supported by a second end of the outer casing, the output shaft having a flange with an output shaft locking cam means; and a brake assembly comprising a brake assembly release cam means that is complementary to the input shaft release cam means, a brake assembly locking cam means that is complementary to the output shaft locking cam means, a biasing member, and at least one brake pad;

wherein the brake assembly is movable between a brake position where the one or more brake pads are in contact with the first end of the outer casing and a release position where the one or more brake pads are not in contact with the first end of the outer casing, wherein the complementary release cam means of the input shaft and brake assembly are operable to move the brake assembly to the release position when sufficient torque is applied to the input shaft, wherein the complementary locking cam means of the output shaft and brake assembly are operable to move the brake assembly to the brake position when sufficient torque is applied to the output shaft, wherein torque applied to the output shaft is not translated to the input shaft when the brake assembly is in the brake position, wherein torque applied to the input shaft is translated to the output shaft when the brake assembly is in the release position, wherein the release cam means of the input shaft includes at least one release cam divot located on a flange of the input shaft,
wherein the release cam means of the brake assembly includes at least one release cam divot located on a locking disc, and
wherein a bearing is disposed between each of the release cam divots of the input shaft and the corresponding release cam divots of the locking disc,
wherein one of the input shaft or the locking disc further includes a track having a pre-determined depth that connects each of the release cam divots thereon, wherein each of the bearings roll onto the track when a pre-determined amount of torque is applied to the input shaft.

* * * * *

UNITED STATES PATENT AND TRADEMARK OFFICE
CERTIFICATE OF CORRECTION

PATENT NO. : 6,974,015 B2
DATED : December 13, 2005
INVENTOR(S) : Michael E. Gamache It is certified that error appears in the above-identified patent and that said Letters Patent is hereby corrected as shown below:

<u>Column 10,</u>
Line 21, "such that" should have been omitted.

Signed and Sealed this

Twenty-first Day of March, 2006

JON W. DUDAS
*Director of the United States Patent and Trademark Office*